US012628839B2

(12) United States Patent
Meyer

(10) Patent No.: US 12,628,839 B2
(45) Date of Patent: May 19, 2026

(54) EMULSION FOR IMPROVING MEAT

(71) Applicant: Texas Tech University System, Lubbock, TX (US)

(72) Inventor: Richard Schlomer Meyer, Harrison, ID (US)

(73) Assignee: Texas Tech University System, Lubbock, TX (US)

( * ) Notice: Subject to any disclaimer, the term of this patent is extended or adjusted under 35 U.S.C. 154(b) by 394 days.

(21) Appl. No.: 18/302,427

(22) Filed: Apr. 18, 2023

(65) Prior Publication Data

US 2023/0248009 A1 Aug. 10, 2023

Related U.S. Application Data

(63) Continuation-in-part of application No. 16/180,816, filed on Nov. 5, 2018, now Pat. No. 11,647,760, which is a continuation-in-part of application No. 15/555,439, filed as application No. PCT/US2016/020651 on Mar. 3, 2016, now Pat. No. 11,357,247.

(60) Provisional application No. 62/128,344, filed on Mar. 4, 2015.

(51) Int. Cl.
| | |
|---|---|
| *A23B 4/20* | (2006.01) |
| *A23B 2/733* | (2025.01) |
| *A23B 2/754* | (2025.01) |
| *A23B 2/771* | (2025.01) |
| *A23B 2/788* | (2025.01) |
| *A23B 4/005* | (2006.01) |
| *A23B 4/023* | (2006.01) |
| *A23B 4/03* | (2006.01) |
| *A23B 4/16* | (2006.01) |
| *A23L 17/00* | (2016.01) |
| *B65B 25/06* | (2006.01) |
| *B65B 31/04* | (2006.01) |

(52) U.S. Cl.
CPC ............... *A23B 4/20* (2013.01); *A23B 2/733* (2025.01); *A23B 2/754* (2025.01); *A23B 2/771* (2025.01); *A23B 2/788* (2025.01); *A23B 4/005* (2013.01); *A23B 4/0235* (2013.01); *A23B 4/03* (2013.01); *A23B 4/16* (2013.01); *A23L 17/00* (2016.08); *B65B 25/062* (2013.01); *B65B 31/048* (2013.01)

(58) Field of Classification Search
CPC .. A23V 2002/00; A23D 7/0053; A23D 7/003; A23D 9/06; A23L 29/10; A23L 25/10; A23L 23/00; A23L 27/60; A23L 27/10; A23G 1/48; A23G 1/36; A23G 1/32; C11B 5/0085; C11B 5/0035
USPC ....................................................... 426/601
See application file for complete search history.

(56) References Cited

U.S. PATENT DOCUMENTS

| | | | |
|---|---|---|---|
| 1,395,934 A | 11/1921 | Stockton | |
| 1,398,352 A | 11/1921 | Willison | |
| 2,944,906 A * | 7/1960 | Spitzer ..................... | A23L 27/60 |
| | | | 426/605 |
| 3,264,121 A * | 8/1966 | Tuomy ...................... | A23B 2/92 |
| | | | 426/640 |
| 3,542,565 A * | 11/1970 | Stauffer ................... | A23L 27/60 |
| | | | 426/605 |
| 3,857,975 A * | 12/1974 | Misaki ................... | A23L 29/271 |
| | | | 426/573 |
| 3,930,057 A | 12/1975 | Jokay | |
| 4,105,461 A * | 8/1978 | Racciato .................. | B01J 19/06 |
| | | | 106/206.1 |
| 4,308,294 A | 12/1981 | Rispoli et al. | |
| 4,913,921 A | 4/1990 | Schroeder et al. | |
| 5,366,754 A | 11/1994 | Rudan et al. | |
| 5,395,631 A | 3/1995 | Sweeney | |
| 5,425,957 A | 6/1995 | Gaim-Marsoner et al. | |
| 5,605,697 A * | 2/1997 | Asano ...................... | A23L 27/32 |
| | | | 426/654 |
| 5,958,498 A * | 9/1999 | Trueck .................... | A23L 27/66 |
| | | | 426/605 |
| 6,423,363 B1 * | 7/2002 | Traska .................... | A23L 33/11 |
| | | | 426/604 |
| 6,544,573 B1 | 4/2003 | Pajela et al. | |
| 2005/0084471 A1 * | 4/2005 | Andrews ............... | A23L 33/175 |
| | | | 424/70.31 |

(Continued)

FOREIGN PATENT DOCUMENTS

| | | |
|---|---|---|
| CA | 2357861 A1 | 3/2002 |
| CN | 102907703 A * | 2/2013 |

(Continued)

OTHER PUBLICATIONS

NPL Stephanie et al. (entitled "Oxidative and thermal stabilities of genetically modified high oleic sunflower oil" in Food Chemistry 102, 1208-1213, 2007 (Year: 2007).*

(Continued)

*Primary Examiner* — Erik Kashnikow
*Assistant Examiner* — Bhaskar Mukhopadhyay
(74) *Attorney, Agent, or Firm* — Edwin S. Flores; Daniel J. Chalker; Chalker Flores, LLP

(57) ABSTRACT

The present invention includes a method and method for preserving a fish or seafood product comprising: contacting an emulsion with a meat product for a time sufficient to, wherein the emulsion comprises by weight: 10% to 50% water, 0.1 to 4.0% *Quillaja*, 0.1% to 8% meat flavoring, 60% to 85% high oleic sunflower oil, meat seasoning, 0-2.0% salt; salt, and optionally adding one or more stabilizers; a first pasteurizing step; vacuum packing the fish or seafood in a moisture and oxygen-impermeable packaging film; a second pasteurizing step.

23 Claims, 10 Drawing Sheets

(56)                References Cited

U.S. PATENT DOCUMENTS

| | | | | |
|---|---|---|---|---|
| 2005/0244564 A1 | 11/2005 | Perlman | | |
| 2006/0216391 A1 | 9/2006 | Delsol | | |
| 2008/0050494 A1 | 2/2008 | Meyer | | |
| 2008/0069928 A1 | 3/2008 | Moder et al. | | |
| 2008/0181990 A1* | 7/2008 | Ledbetter | ............. | A23D 7/0053 |
| | | | | 426/601 |
| 2012/0241336 A1* | 9/2012 | Finley | ................ | B65D 81/3294 |
| | | | | 206/219 |
| 2012/0241443 A1* | 9/2012 | Tang | .................... | H05B 6/6441 |
| | | | | 219/679 |
| 2016/0302453 A1* | 10/2016 | Suppes | ............. | B65D 81/3453 |

FOREIGN PATENT DOCUMENTS

| | | | | | |
|---|---|---|---|---|---|
| EP | 689773 | A1 | 1/1996 | | |
| JP | S6232898 | B2 * | 7/1987 | | |
| WO | WO-2014121141 | A1 * | 8/2014 | ............. | A23L 13/60 |

OTHER PUBLICATIONS

NPL Kwan et al. (in J Food Sci. 56(6), 1537-1541,1991) (Year: 1991).*

Cleveland et al. (in Effect of natural antioxidant concentration on lipid oxidation of ready-to-eat ground beef links from cattle fed distillers grains in different phases of production, Nebraska Beef Cattle Report, 2014. pp. 109-110) (Year: 2014).*

Ghosh et al. (in JAOCS vol. 73, No. 10 , pp. 1271-1274, 1996) (Year: 1996).*

Cleveland, Brady D. et al. "Effect of Natural Antioxidant Concentration on Lipid Oxidation of Ready-to-Eat Ground Beef Links from Cattle Fed Distillers Grains in Different Phases of Production" 2014 Nebraska Beef Cattle Report p. 109-110.

Ghosh et al. " Isolation of Tocopherol and Sterol Concentrate from Sunflower Oil Deodorizer Distillate" JAOCS vol. 73 (10) pp. 1271-127 4, 1996.

International Search Report (PCT/US2016/020651) mailed Jun. 10, 2016.

Kwan, L., et al. "Fractionation of water-soluble and-insoluble components from egg yolk with minimum use of organic 4 solvents." Journal of Food Science 56.6 (1991): 1537-1541.

Smith, Stephanie et al. "Oxidative and thermal stabilities of genetically modified high oleic sunflower oil" Food Chemistry 102: 1208-1213, 2007.

* cited by examiner

Eggless Mayo-Heat Stable, freeze-thaw stable & all Natural

| | | Figure 1 | Heat Stable, all natural — Eggless A version | | Heat stable, freeze-thaw stable, all natural — Eggless Improved | | Heat stable, freeze-thaw stable, all natural — butter spread | |
|---|---|---|---|---|---|---|---|---|
| | | 1/19/2015 best | % | batch | B | C | % | batch |
| Add | | Pre-blend water soluble ingredients | | 1000.00 | | | | 1000.000 |
| 1 | | water, distilled, no minerals | 15.781% | 157.81 | 14.556% | 13.864% | 13.864% | 138.640 |
| 2 | TIC | Ticaloid 1155 (Gum Arabic/guar/Xanthan Gum) 0.2 to 0.4% | | 10.00 | 0.300% | 0.300% | 0.300% | 3.000 |
| 3 | HORN | Quillaja natural flavor | 1.000% | 0.69 | 1.000% | 1.000% | 1.000% | 10.000 |
| 4 | Heinz | white vinegar (50 grain) | 0.069% | 0.92 | 0.069% | 0.069% | 0.069% | 0.690 |
| 5 | | Lemon juice, natural strength, all natural | 0.092% | 8.25 | 0.092% | 0.092% | 0.092% | 0.920 |
| 6 | | salt | 0.825% | | 0.825% | 0.825% | 0.825% | 8.250 |
| 7 | Ocean's flavor | sea salt # 68 | | | 0.825% | 0.825% | 0.825% | 8.250 |
| | | sugar | 1.468% | 14.68 | 1.468% | 0.000% | 0.000% | 0.000 |

*FIG. 1A*

| Eggless Mayo-Heat Stable, freeze-thaw stable & all Natural | Figure 1 | Heat Stable, all natural | | Heat stable, freeze-thaw stable, all natural | | Heat stable, freeze-thaw stable, all natural | |
|---|---|---|---|---|---|---|---|
| | | Eggless A version | | Eggless Improved | | butter spread | |
| 1/19/2015 best | | % | batch | B | C | % | batch |
| Add | Pre-blend water soluble ingredients | | 1000.00 | | | | 1000.000 |
| 8  Agave Processor's | Agave Premium Syrup (South Africa), very bland, 70 brix | | | | 2.160% | 2.160% | 21.600 |
| 9  McCormick's | mustard flour | 0.119% | 1.19 | 0.119% | 0.119% | 0.119% | 1.190 |
| 10  PMP Fermentation | gluconic acid (50%) | 0.917% | 9.36 | 0.917% | 0.917% | 0.917% | 9.170 |
| 11  WTI | Dry Vinegar | | | 0.100% | 0.100% | 0.100% | 1.000 |
| | Pre-blend oil, gums, flavor and antioxidants | | | | | | 0.000 |
| 12  Ungerer | nat. egg flavor F 14752 | 0.037% | 0.37 | 0.037% | 0.037% | 0.037% | 0.370 |
| Cargill Clear valley | High oleic sunflower oil | 79.500% | 795.00 | 79.500% | 79.500% | | 0.000 |
| Kemin fortium: tocopherols | MTD-10 (0.015% of oil) | 0.092% | 0.92 | 0.092% | 0.092% | 0.092% | 0.920 |
| Kemin fortium: Rosemary & green tea extracts | RGT12 plus dry (0.2% of product) | 0.100% | 0.92 | 0.100% | 0.100% | 0.100% | 1.000 |
| 12a  www.worldgrocer.com | Clarified Butter/Ghee: (label: fresh pasteurized cream) | | | | | 79.500% | 795.000 |
| | aerate with nitrogen to improve spreadability | 80.765% | 807.76 | 80.865% | 83.025% | 83.025% | 830.250 |

1. blend water, vinegar, lemon juice, Quillaia, dry ingredients in a Cuisinart mixer 2. Slowly add the oil to generate a smooth, creamy emulsion.

*FIG. 1B*

| Eggless Mayonnaise--Heat Stable & all Natural | | Heat stable Mayonnaise (egg) | | Heat stable, Freeze-thaw stable Mayonnaise (egg) | |
|---|---|---|---|---|---|
| Add | 10/5/2014 | Figure 2 | | | |
| | | MA | MB | MAF | MBF |
| | Pre-blend water soluble ingredients | | | | |
| 1 | water, distilled, no minerals | 11.781% | 13.781% | 11.481% | 13.481% |
| 2 | HORN — Quillaja natural flavor | 1.000% | 1.000% | 1.000% | 1.000% |
| 3 | Heinz — white vinegar (50 grain) | 0.069% | 0.069% | 0.069% | 0.069% |
| 4 | Lemon juice, natural strength, all natural | 0.092% | 0.092% | 0.092% | 0.092% |
| 5 | TIC — Ticaloid 1155 (Gum Arabic/guar/Xanthan Gum) 0.2 to 0.4% | 0.300% | | 0.300% | 0.300% |
| 6 | salt | 0.825% | 0.825% | 0.825% | 0.825% |
| 6 | Ocean's flavor — sea salt # 68 | | | | |
| 7 | sugar | 1.468% | 1.468% | 1.468% | 1.468% |
| 7 | Agave Processor's: Agave Premium Syrup (South Africa), very bland | | | | |
| 8 | McCormick's — mustard flour | 0.119% | 0.119% | 0.119% | 0.119% |
| 9 | PMP Fermentation — gluconic acid (50%) | 0.917% | 0.917% | 0.917% | 0.917% |
| | Pre-blend oil flavor and antioxidants | | | | |
| | Ungerer — nat. egg flavor F 14752 | 0.037% | 0.037% | 0.037% | 0.037% |
| | Cargill — High oleic sunflower oil | 79.500% | 79.500% | 79.500% | 79.500% |
| 10 | Kemin fortium: mixed tocopherols — MTD-10 (0.015% of oil) | 0.092% | 0.092% | 0.092% | 0.092% |
| | Kemin fortium: Rosemary & green tea extracts — RGT12 plus dry (0.2% of product) | 0.100% | 0.100% | 0.100% | 0.100% |
| 12 | egg yolks | | | | |
| 13 | whole eggs | 4.000% | 2.000% | 4.000% | 2.000% |
| 14 | Ca EDTA (75 ppm) | | | | |
| | | 100.000% | 100.000% | 100.000% | 100.000% |

1. blend water, vinegar, lemon juice, Quillaja, dry ingredients in a Cuisinart mixer with blade operating at high speed.

2. Slowly add the oil to generate a smooth, creamy emulsion.

FIG. 2

Eggless Mayo--Heat Stable & all Natural

| | 1/25/2015 best | Figure 3 | C-2 — Heat stable, freeze-thaw stable, all natural, less sodium | | E — Heat stable, freeze-thaw stable, all natural, 50% less sodium | |
|---|---|---|---|---|---|---|
| Add | | | | Batch | | Batch |
| | | Pre-blend water soluble ingredients | | 1000.00 | | 1000.00 |
| 1 | | water, distilled, no minerals | 13.014% | 130.140 | 13.714% | 137.14 |
| 2 | TIC | Ticaloid 1155 (Gum Arabic/guar/Xanthan Gum) 0.2 to 0.4% | 0.300% | 3.000 | 0.200% | 2.00 |
| 3 | HORN | Quillaja natural flavor | 1.000% | 10.000 | 1.000% | 10.00 |
| 4 | Heinz | white vinegar (50 grain) | 2.569% | 25.690 | 2.569% | 25.69 |
| 5 | | Lemon juice, natural strength, all natural | 0.092% | 0.920 | 0.092% | 0.92 |
| 6 | | salt | 0.625% | 6.250 | 0.325% | 3.25 |
| 7 | Ocean's flavor | sea salt # 68 | 0.625% | 6.250 | 0.325% | 3.25 |
| 8 | Agave Processor's | Agave Premium Syrup (South Africa), very bland | 2.160% | 21.600 | 2.160% | 21.60 |
| 9 | McCormick's | Mayo mustard | 0.119% | 1.190 | 0.119% | 1.19 |
| 10 | PMP Fermentation | gluconic acid (50%) | 0.717% | 7.170 | 0.717% | 7.17 |
| 11 | Kemin fortium: Rosemary & green tea extracts | RGT12 plus dry (0.2% of product) | 0.100% | 1.000 | 0.100% | 1.00 |
| 12 | WTI | Dry Vinegar | 0.050% | 0.500 | 0.050% | 0.50 |
| | | Pre-blend oil, gums, flavor and antioxidants | | | | 0.00 |
| 13 | Ungerer | nat. egg flavor F 14752 | 0.037% | 0.370 | 0.037% | 0.37 |
| 13 | Cargill Clear valley | High oleic sunflower oil | 78.500% | 785.000 | 78.500% | 785.00 |
| 13 | Kemin fortium: tocopherols | MTD-10 (0.015% of oil) | 0.092% | 0.920 | 0.092% | 0.92 |
| 14 | GNT Exberry | natural Shade "Celestial yellow" # 474503 | | | | |
| 15 | GNT Exberry | natural Shaded "Mango yellow" # 450005 | | | | |
| | | | 100.000% | 1000.000 | 100.000% | 1000.00 |

1. blend water, vinegar, lemon juice, Quillaja, dry ingredients in a Cuisinart mixer with blade operating at high speed.

2. Slowly add the oil to generate a smooth, creamy emulsion.

*FIG. 3*

| Eggless Mayo--Heat Stable & all Natural | | | Heat stable, freeze-thaw stable, 50% less sodium and all natural | | | |
|---|---|---|---|---|---|---|
| | | | Eggless Improved | | | |
| 1/25/2015 best | | Figure 4 | B | | C | |
| | | | | Batch | | Batch |
| Add | | Pre-blend water soluble ingredients | | 1000.00 | | 1000.00 |
| 1 | | water, distilled, no minerals | 15.156% | 151.560 | 14.464% | 144.640 |
| 2 | TIC | Ticaloid 1155 (Gum Arabic/guar/Xanthan Gum) 0.2 to 0.4% | 0.300% | 3.000 | 0.300% | 3.000 |
| 3 | HORN | Quillaja natural flavor | 1.000% | 10.000 | 1.000% | 10.000 |
| 4 | Heinz | white vinegar (50 grain) | 0.069% | 0.690 | 0.069% | 0.690 |
| 5 | | Lemon juice, natural strength, all natural | 0.092% | 0.920 | 0.092% | 0.920 |
| 6 | | salt | 0.625% | 6.250 | 0.625% | 6.250 |
| 7 | Ocean's flavor | sea salt # 68 | 0.625% | 6.250 | 0.625% | 6.250 |
| 8 | | sugar | 1.468% | 14.680 | 0.000% | 0.000 |
| 8 | Agave Processor's | Agave Premium Syrup (South Africa), very bland | | 0.000 | 2.160% | 21.600 |
| 9 | McCormick's | mustard flour | 0.119% | 1.190 | 0.119% | 1.190 |
| 10 | PMP Fermentation | gluconic acid (50%) | 0.717% | 7.170 | 0.717% | 7.170 |
| 11 | WTI | Dry Vinegar | 0.100% | 1.000 | 0.100% | 1.000 |
| | | Pre-blend oil, gums, flavor and antioxidants | | 0.000 | | 0.000 |
| | Ungerer | nat. egg flavor F 14752 | 0.037% | 0.370 | 0.037% | 0.370 |
| | Cargill Clear valley | High oleic sunflower oil | 79.500% | 795.000 | 79.500% | 795.000 |
| 12 | Kemin fortium: tocopherols | MTD-10 (0.015% of oil); mixed tocoherols | 0.092% | 0.920 | 0.092% | 0.920 |
| 12 | Kemin fortium: Rosemary & green tea extracts | RGT12 plus dry (0.2% of product); Rosemary extract & green tea extract | 0.100% | 1.000 | 0.100% | 1.000 |
| 13 | GNT Exberry | natural Shade "Celestial yellow" # 474503 | | | | |
| 14 | GNT Exberry | natural Shaded "Mango yellow" # 450005 | | | | |
| | | add natural colors to match the yellow tint on mayonnaise from the egg yolks | | | | |
| | | | 100.000% | 1000.000 | 100.000% | 1000.000 |

1. blend water, vinegar, lemon juice, Quillaja, dry ingredients in a Cuisinart mixer with blade operating at high speed.

2. Slowly add the oil to generate a smooth, creamy emulsion.

FIG. 4

All natural, non-melting cheese and cheese sauces

| | solid & semisoft cheeses | cheese sauces | preferred cheese sauce |
|---|---|---|---|
| cheese (cheddar, Swiss, etc.) | 97.0% to 99.9% | 25% to 85% | 64.00% |
| Quillaja | 0.1 to 3.0% | 0.1 to 3.0% | 2.00% |
| | | | |
| cream (30% butter fat) | | 0 to 35% | 12.00% |
| unsalted butter | | 0 to 20% | 12.00% |
| water | | 0 to 35% | 10.00% |
| | | | |
| | | | 100.00% |

All natural, non-melting chocolate

| | | preferred |
|---|---|---|
| Quillaja | 0.1 to 3.0% | 2.00% |
| Chocolate: sugar, cacao beans, cocoa butter, lecithin, vanilla with or without milk added | 99.9% to 97% | 98.00% |

Process:

1. Cheese & sauces:

a. shredded cheese; add Quillaja; blend; heat to ~ 140 F stirring constantly until cheese has melted and blended completely. Chill to set.

2. cheese sauces:

a. shredded cheese; add Quillaja and water; blend; heat to ~ 140 F stirring constantly, then add cream and butter. Chill to set.

3. Chocolate: Blend semi-sweet chocolate chips with Quillaja; heat to 105 F to 110 F, stirring constantly until thoroughly blended. Immediately chill to 40 to 70 F to set chocolate.

*FIG. 5*

All natural, non-separating nut and seed butters (peanut butter, sunflower seed butter, etc.)

| | % | % | batch weight |
|---|---|---|---|
| | | | 454.00 |
| Quillaja ultra pure NP (0.1% to 10.00% of oil portion) | 0.000% | 1.000% | 4.54 |
| Quillaja (2% of oil) | | | |
| Quillaja is labeled as a natural flavoring | | | 0.00 |
| Adams creamy unsalt peanut butter: | | | 0.00 |
| oil | 50.000% | 49.500% | 224.73 |
| carbohydrates | 187.750% | 18.560% | 84.26 |
| protein | 21.875% | 21.650% | 98.29 |
| water & minerals | 9.375% | 9.290% | 42.18 |
| total | 100.000% | 100.000% | 454.00 |

Process A. Warm creamy nut butter to 120 F and blend in 1% Quillaja (based on oil) and cool to ambient temperature.

Process B: Add 1% Quillaja (based on oil) to nuts or seeds ready to grind; blend to evenly distribute; grind and cool.

*FIG. 6*

| Heat Stable creamy, fat/oil containing Sauces | | Example |
|---|---|---|
| Base | | % |
| water (5.0% to 99.5%) | | 38.800% |
| Quillaja ultra Pure NP (0.1% to 10.0% of oil) | Desert King | 1.200% |
| typically 1% to 2% of the oil | | |
| Desert King International, Quillaja Ultra NP, 100% pure Extract of Quillaja | | |
| Oil sources (0.1% to 85.0%) | | 60.000% |
| High Stability Algal Oil | | |
| vegetable oils | | |
| nut & seed oils | | |
| animal sourced fats & oils | | |
| | | |
| | | 100.000% |
| | | |
| 1. blend water and quillaja. | | |
| 2. VERY Slowly add the oil while blending in a high shear mixer to get an emulsion. | | |
| 3. This stabilized creamy blend is ready to add to the target base (e.g. creamy soup, creamy sauces, creamy desserts, creamy puddings, etc. | | |
| 4. Completed formula can be hot filled, retoned, refrigerated or frozen. | | |

*FIG. 7*

| | supplier | A | A | B | B |
|---|---|---|---|---|---|
| Seasoned Chicken (patties) | | | 600 gram batch | | 600.0000 |
| Coarse ground chicken breast, skinless, boneless | any | 90.00% | 540.0000 | 75.00% | 450.0000 |
| Brine: | | 6.00% | 36.0000 | 21.00% | 126.0000 |
| Emulsion: | | | | | |
| 30% water | any | | | | |
| 2% Quillaja, natural flavoring | Ingredion-Naturex | | | | |
| 68% oil, high oleic sunflower | Cargill | | | | |
| 1% Fried flavor RA 09020-05 | Red Arrow | | | | |
| water to make pumpable? | | | | | |
| Seasoning: | | | | | |
| KFC Seasoning, no salt added | Elite or Kerry | 2.00% | 12.0000 | 2.00% | 12.0000 |
| salt, plain (adjust for flavor) | any | 1.00% | 6.0000 | 1.00% | 6.0000 |
| Natural Crispy Chicken flavor: | | | | | |
| FL RA 1803 | Red Arrow | 1.00% | 6.0000 | 1.00% | 6.0000 |
| Optional Stabilizers: | | | | | |
| Phosphates: 0.5% | WendaPhos 900 or ICL Brifisol 550 | | | | |
| k-carrageenan: 0.1% | TIC gums | | | | |
| Green tea & Rosemary extract: 0.1% | Kemin | | | | |
| mixed tocopherols: 0.05% | Kemin | | | | |
| celery powder: to 180 ppm nitrites | Florida Food Products or Kerry | | | | |
| | | 100.00% | 600.0000 | 100.00% | 600.0000 |
| The coarse ground chicken was blended with the emulsion (made separately), seasonings and flavors. The resulting mix was formed into patties and fried until fully cooked. | | | Patties had a tender, slightly stiff texture, moist and great flavor. | | Patties had a softer texture and very moist, great flavor. |

FIG. 8

EMULSION FOR IMPROVING MEAT

CROSS-REFERENCE TO RELATED APPLICATIONS

This application claims priority to U.S. Provisional Application Ser. No. 62/128,344, filed Mar. 4, 2015, PCT Application No. PCT/US16/20651 filed Mar. 4, 2016, and is a Continuation-in-Part of U.S. application Ser. No. 15/555, 439, filed Sep. 1, 2017, and a Continuation-in-Part of U.S. application Ser. No. 16/180,816, filed Nov. 5, 2018, the entire contents of each of which are incorporated herein by reference.

TECHNICAL FIELD OF THE INVENTION

The present invention relates in general to the field of eggless, heat stable mayonnaise-type dressing and meat applications.

STATEMENT OF FEDERALLY FUNDED RESEARCH

Not Applicable.

BACKGROUND OF THE INVENTION

Without limiting the scope of the invention, its background is described in connection with a mayonnaise-type emulsion.

Many sauces are in the form of emulsions, which are a blend or mixture of two or more liquids that are not soluble. One issue with these types of foods is their tendency to demulsify when subjected to heat.

Mayonnaise is a well-known emulsion of oil in lemon juice that has been stabilized by the molecule lecithin found in the egg yolks. It is used as a sauce for foods and is a favored dressing for sandwiches, salads, and other prepared foods as well as an ingredient in numerous recipes for a variety of foods. It is well known that mayonnaise will demulsify when subjected to heat or freezing temperatures, causing the ingredients to separate, resulting in a gooey mess. The key to making mayonnaise is to avoid having the components of the emulsion separate back into their individual components. This is called "turned" or "broken" mayonnaise. No matter how long the oil and lemon juice are mixed together, they will always separate into a gooey mess unless the egg yolk is added as a stabilizer.

The shelf-life of mayonnaise can vary, depending on the ingredients and the conditions under which it is stored. Usually, once opened, mayonnaise needs to be refrigerated to avoid quick spoliation. Heat can cause the emulsion to break down, resulting in a separation of the ingredients, particularly the oil from the lemon juice. Refrigeration is necessary to slow down the rate of rancidity.

The Food and Drug Administration has promulgated regulations about the contents of mayonnaise at 21 C.F.R. § 169.140. With respect to the use of eggs, the regulation provides in subsection (c) "(c) Egg yolk-containing ingredients. Liquid egg yolks, frozen egg yolks, dried egg yolks, liquid whole eggs, frozen whole eggs, dried whole eggs, or any one or more of the foregoing ingredients listed in this paragraph with liquid egg white or frozen egg white."

Because of concerns about cholesterol, and to accommodate vegan diets, an egg-free type of dressing has been developed with a taste similar to mayonnaise. A popular substitute for the eggs is Soy Protein isolate. Because the eggs are omitted from the ingredients, the dressing can no longer be called "mayonnaise" under the federal regulations. However, FDA now allows eggless mayonnaise to be called "Mayo".

Many meat product being with poor texture, organoleptic characteristics, and can give a heavy feeling after consumption. What are needed are better methods and compositions for processing meats that improve, noticeably, the organoleptic characteristics of meat and meat products.

SUMMARY OF THE INVENTION

In one embodiment, the present invention includes a method for preserving a fish or seafood product comprising: contacting an emulsion with a meat product for a time sufficient to, wherein the emulsion comprises by weight: 10% to 50% water, 0.1 to 4.0% *Quillaja,* 0.1% to 8% meat flavoring, 60% to 85% high oleic sunflower oil, meat seasoning, 0-2.0% salt, and optionally adding one or more stabilizers; a first pasteurizing step; vacuum packing the fish or seafood in a moisture and oxygen-impermeable packaging film; and a second pasteurizing step. In one aspect, the method further comprises a drying step selected from a drying time of 2 hours or less hours, wherein the fish or seafood is at about 11 mm (or ³⁄₁₆ inch) thick and is dried to a water activity between 0.89 to 0.91. In another aspect, the method further comprises a heating step of 5 to 10 minutes at 170.6° F./77° C. in a vacuum pack or bag. In another aspect, the method further comprises injecting the emulsion into the muscle of the fish or seafood. In another aspect, the fish or seafood is selected from tuna, salmon, sea-bass, herring, anchovy, sardine, pollock, catfish, flounder, lake trout, grouper, halibut, mahi mahi, orange roughy, red snapper, shark, swordfish, tilefish oil, cod, eel, hake, trout, tilapia, whiting, mackerel, shrimp, crab, shellfish, mussel, scallop, clam shell, prawn, or squid. In another aspect, the first, the second, or both pasteurizing step of the fish or seafood is at a temperature of 140° F. to 145° F. for 30 or more minutes, or for 1 to 5 minutes at 160° F. to 165° F. In another aspect, the method further comprises adding 0.01% to 0.3% RGT 12 Plus Dry, 0.01% to 1.0% by weight of a gum or gum blend including one or more natural gums selected from the group consisting of gum Arabic, guar and Xanthan gum. In another aspect, the gum blend comprises 50% gum Arabic, 30% guar gum and 20% Xanthan gum. In one aspect, the emulsion is defined further as comprising, by weight, 11.00-14.00% water, 1.0% *Quillaja,* 0.07% white vinegar, 0.09-0.10% lemon juice, 0.80-0.90% salt, 1.40-1.50% sugar, 0.10-0.12% mustard flour, 0.90-1.00% gluconic acid; and a pre-blend comprising: 0.03-0.04% natural egg flavor, 79.0-80.0% high oleic sunflower oil, 0.09-0.10% tocopherols (diluted to 0.015% in oil), 0.10% blend of rosemary and green tea extracts, and 2% to 4% eggs; and 0.1% to 0.3% CaEDTA. In one aspect, the preservatives are selected from at least one of: phosphates, k-carrageenan, green tea extract, rosemary extract, mixed tocopherols, celery powder, or beet powder, to 180 ppm nitrites. In one aspect, the emulsion is defined further as comprising, by weight, 11.781% to 13.781% water, 1.0% *Quillaja,* 0.069% white vinegar, 0.092% lemon juice, 0.825% salt, 1.468% sugar, 0.119% mustard flour, 0.917% gluconic acid; and a pre-blend comprising: 0.037% natural egg flavor, 79.5% high oleic sunflower oil, 0.092% MTD-10, 0.1% RGT12 Plus Dry, 2% to 4% eggs; and 0.1% to 0.3% CaEDTA. In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum. In one aspect, the gum blend includes by weight 50% gum Arabic, 30% guar gum and 20% Xanthan gum. In another aspect, the meat is contacted with the emulsion for at least 1 to 90 minutes at room temperature. In another aspect, the meat is selected from beef, veal, buffalo, lamb, goat, chicken, pork, emu, ostrich, game hen, squab, guinea fowl, turkey, pheasant, quail, duck, or goose. In another aspect, the method further comprises the step of chemical tenderizing selected from the group consisting of aging in the composition, acids, spices, enzymes, and combinations thereof. In another aspect, the method further comprises the step of mechanical tenderizing selected from the group consisting of pounding, needle tenderizing, injecting, grinding, and combinations thereof. In another aspect, the emulsion is a concentrate emulsion. In another aspect, the emulsion is a ready-to-use emulsion. In another aspect, the meat is a whole animal, leg, thigh, breast, ribs, flank, loin, sausages, processed meat products, jerky, or other cut of meat, processed or ground meat.

In another embodiment, the present invention includes a fish or seafood product comprising: contacting an emulsion with a meat product for a time sufficient to, wherein the emulsion comprises by weight: 10% to 50% water, 0.1 to 4.0% Quillaja, 0.1% to 8% meat flavoring, 60% to 85% high oleic sunflower oil, meat seasoning, 0-2.0% salt; and optionally adding one or more stabilizers; a first pasteurizing step of the fish or seafood at a temperature of 140° F. to 145° F. for 30 or more minutes, or for 1 to 5 minutes at 160° F. to 165° F.; vacuum packing the fish or seafood in a moisture and oxygen-impermeable packaging film; a second pasteurizing step at a temperature of 140° F. to 145° F. for 30 or more minutes, or for 1 to 5 minutes at 160° F. to 165° F. In one aspect, the method further comprises a drying step selected from a drying time of 2 hours or less hours, wherein the fish or seafood is at about 11 mm (or 3/16 inch) thick and is dried to a water activity between 0.89 to 0.91. In another aspect, the method further comprises a heating step of 5 to 10 minutes at 170.6° F./77° C. in a vacuum pack or bag. In another aspect, the method further comprises injecting the emulsion into the muscle of the fish or seafood. In another aspect, the fish or seafood is selected from tuna, salmon, sea-bass, herring, anchovy, sardine, pollock, catfish, flounder, lake trout, grouper, halibut, mahi mahi, orange roughy, red snapper, shark, swordfish, tilefish oil, cod, eel, hake, trout, tilapia, whiting, mackerel, shrimp, crab, shellfish, mussel, scallop, clam shell, prawn, or squid. In another aspect, the first, the second, or both pasteurizing step of the fish or seafood is at a temperature of 140° F. to 145° F. for 30 or more minutes, or for 1 to 5 minutes at 160° F. to 165° F. In another aspect, the method further comprises adding 0.01% to 0.3% RGT 12 Plus Dry, 0.01% to 1.0% by weight of a gum or gum blend including one or more natural gums selected from the group consisting of gum Arabic, guar and Xanthan gum. In another aspect, the gum blend comprises 50% gum Arabic, 30% guar gum and 20% Xanthan gum. In one aspect, the emulsion is defined further as comprising, by weight, 11.00-14.00% water, 1.0% Quillaja, 0.07% white vinegar, 0.09-0.10% lemon juice, 0.80-0.90% salt, 1.40-1.50% sugar, 0.10-0.12% mustard flour, 0.90-1.00% gluconic acid; and a pre-blend comprising: 0.03-0.04% natural egg flavor, 79.0-80.0% high oleic sunflower oil, 0.09-0.10% tocopherols (diluted to 0.015% in oil), 0.10% blend of rosemary and green tea extracts, and 2% to 4% eggs; and 0.1% to 0.3% CaEDTA. In one aspect, the preservatives are selected from at least one of: phosphates, k-carrageenan, green tea extract, rosemary extract, mixed tocopherols, celery powder, or beet powder, to 180 ppm nitrites. In one aspect, the emulsion is defined further as comprising, by weight, 11.781% to 13.781% water, 1.0% Quillaja, 0.069% white vinegar, 0.092% lemon juice, 0.825% salt, 1.468% sugar, 0.119% mustard flour, 0.917% gluconic acid; and a pre-blend comprising: 0.037% natural egg flavor, 79.5% high oleic sunflower oil, 0.092% MTD-10, 0.1% RGT12 Plus Dry, 2% to 4% eggs; and 0.1% to 0.3% CaEDTA. In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum. In one aspect, the gum blend includes by weight 50% gum Arabic, 30% guar gum and 20% Xanthan gum. In another aspect, the meat is contacted with the emulsion for at least 1 to 90 minutes at room temperature. In another aspect, the meat is selected from beef, veal, buffalo, lamb, goat, chicken, pork, emu, ostrich, game hen, squab, guinea fowl, turkey, pheasant, quail, duck, or goose. In another aspect, the meat is chemically tenderized by aging in the composition, acids, spices, enzymes, and combinations thereof. In another aspect, the meat is mechanically tenderized by pounding, needle tenderizing, injecting, grinding, and combinations thereof. In another aspect, the emulsion is a concentrate emulsion. In another aspect, the emulsion is a ready-to-use emulsion. In another aspect, the meat is a whole animal, leg, thigh, breast, ribs, flank, loin, sausages, processed meat products, jerky, or other cut of meat, processed or ground meat.

BRIEF DESCRIPTION OF THE DRAWINGS

For a more complete understanding of the features and advantages of the present invention, reference is now made to the detailed description of the invention along with the accompanying figures and in which:

FIGS. 1A and 1B represent a table for four eggless mayo compositions and a butter spread composition;

FIG. 2 is a table of four mayonnaise compositions that are heat stable and all natural, and that are heat stable as well as freeze-thaw stable;

FIG. 3 is a table of two eggless mayo compositions that are an alternative to the compositions of FIGS. 1A-1B;

FIG. 4 is a table of two compositions of heat stable and all natural eggless mayo that achieve a 50% reduction in sodium;

FIG. 5 is a table for all-natural, non-melting cheese, cheese sauces, and all-natural, non-melting chocolate;

FIG. 6 is a table for all-natural, non-separating nut and seed butters; and

FIG. 7 is a table for heat stable cream, fat or oil containing sauces.

FIG. 8 is a table that shows the improved organoleptic characteristics of a meat product using the present invention.

DETAILED DESCRIPTION OF THE INVENTION

Figure 9:
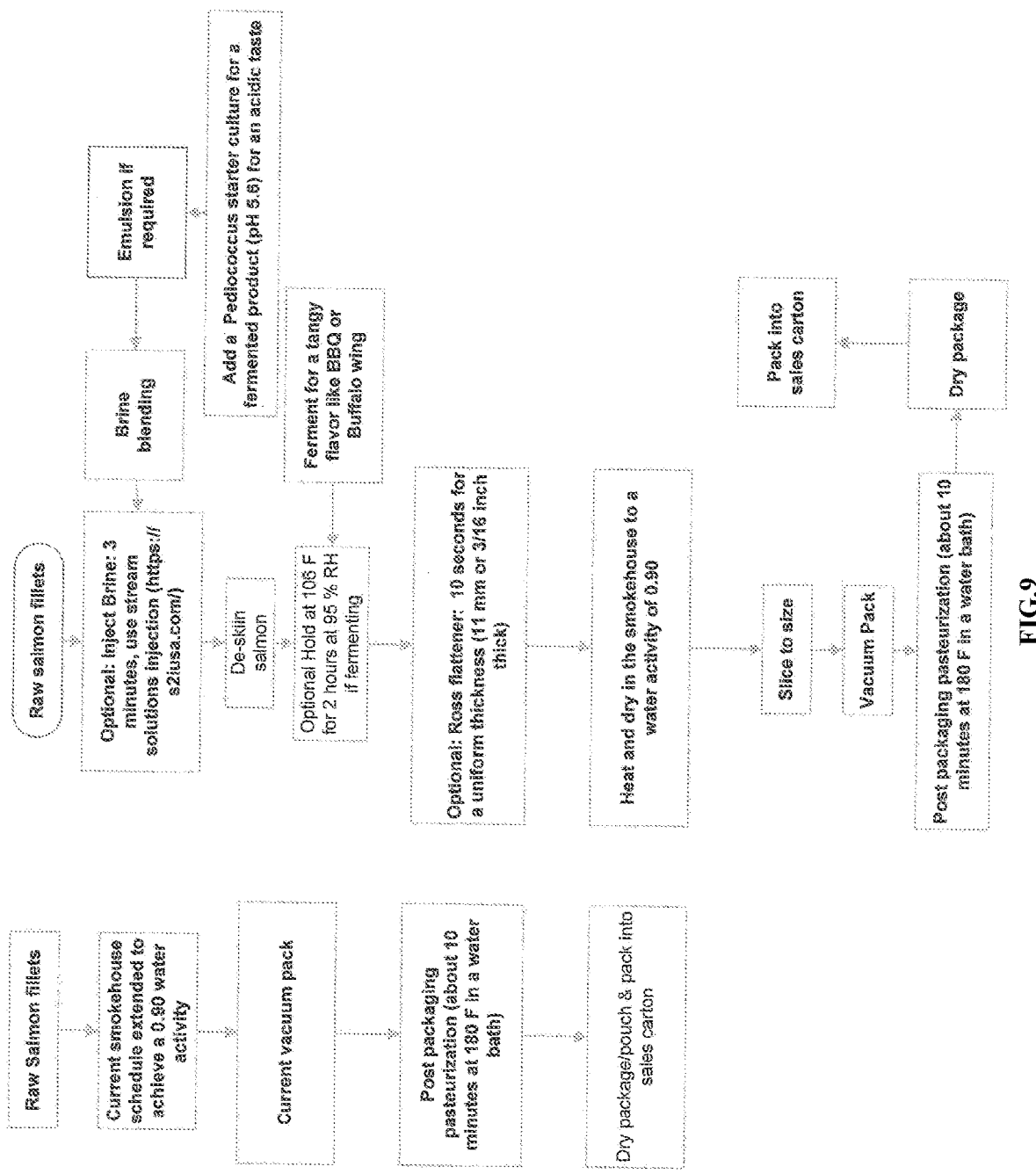
FIG. 9 is a flow chart for the processing of salmon or seafood.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention includes the emulsion and its use in a process to tenderize meat, stabilize meat texture, and preserve color in meat and meat products.

As used herein, the term "organoleptic" refers to a sensation in the mouth of an individual, e.g., lightness, flavoring, texture, etc. In certain aspects, an improved organoleptic formulation or composition is one in which an individual experiences via the senses—including taste, sight, smell, and touch.

As used herein, the meat can be any meat that is suitable for human or animal consumption, including but not limited to beef, veal, buffalo, lamb, goat, chicken, pork, emu, ostrich, game hen, squab, guinea fowl, turkey, pheasant, quail, duck, or goose. The meat can be an animal or any part of an animal, including but not limited to: a whole animal, leg, thigh, breast, ribs, flank, loin, or other cut of meat, processed or ground meat.

An all-natural mayonnaise is provided that includes 10% to 25% water, 0.1% to 8% natural or *Quillaja* flavoring, 0.01% to 12% white vinegar, 0.05% to 12% lemon juice, 0.1% to 20% gluconic acid, 0.1% to 2.5% salt, 0.1% to 5% sugar, and 0.05% to 2.0% mustard flour. The composition further includes a pre-blend of 0.01% to 1.0% natural egg flavor F 14752, 60% to 85% high oleic sunflower oil, 0.01% to 0.3% RGT 12 Plus Dry. The water, *Quillaja*, and dry ingredients are blended in a high shear mixer. The pre-blended oil ingredients are then added very slowly, preferably at a high blending speed, to obtain the emulsion.

It is to be understood throughout this description that while high oleic sunflower oil is preferred, any oil of plant or animal origin can be used. The most used oils in mayonnaise are soybean oil, canola oil, safflower oil, peanut oil, corn oil, olive oil, but there are many others (avocado, algae) that can be used in the compositions of the present disclosure. More particularly, the oils fall into several classes: vegetable (canola, soybean, corn, avocado, etc.), nuts (peanut, coconut, walnut, almond, hazelnut, etc.), seeds (pumpkin, sunflower, cottonseed, sesame seed, etc.), animal (butterfat, lard, tallow, etc.), algal oil, and fish oils.

It is to be further understood that the sugar can be substituted with any sweetener like agave nectar, which is described further herein, as well as honey, high fructose corn syrup, and fruit concentrates.

In one non-limiting example, the natural flavoring is *Quillaja*, which is approved by the FDA for human consumption. It is available from Desert King International located in San Diego, Calif., USA.

Referring next to FIGS. 1A-1B, shown therein is a table for both an all-natural mayonnaise with an added extract and for an all-natural eggless mayo formed in accordance with the present disclosure. Also the products disclosed herein can be made with one or a variety of acidulants. Besides vinegar or acetic acid, one could use gluconic acid, lemon juice, citric acid, as well as lactic acid or malic acid.

Referring to column A, eggless version, a heat stable formulation or composition is provided to include water that is distilled, having no minerals, at 15.781%; *Quillaja* natural flavor at 1.0%; white vinegar (50 grain) at 0.069%; lemon juice, natural strength, and all natural 0.092%; salt at 0.825%; sugar at 1.468%; mustard flour at 0.119%; gluconic acid (50%) at 0.917%; and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. Ideally this is aerated with nitrogen to improve spreadability. The water, *Quillaja*, and dry ingredients are blended in a high shear mixer. The pre-blended oil ingredients are then added very slowly to obtain the emulsion.

This eggless version can be improved as shown in column B to remain all natural and be heat stable and freeze-thaw stable using the following composition: water that is distilled, having no minerals, at 14.556%; Ticaloid 1155 (gum Arabic/guar/Xanthan Gum 0.2% to 0.4%) at 0.300%; *Quillaja* natural flavor at 1.0%; white vinegar (50 grain) at 0.069%; lemon juice, natural strength, and all natural 0.092%; salt at 0.825%; sea salt #68 at 0.825%; sugar at 1.468%; mustard flour at 0.119%; gluconic acid (50%) at 0.917%; dry vinegar and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. Ideally this is aerated with nitrogen to improve spreadability. The water, *Quillaja*, and dry ingredients are blended in a high shear mixer. The pre-blended oil ingredients are then added very slowly, preferably at a high blending speed, to obtain the emulsion.

Column C shows a further composition for improved eggless mayo in which the foregoing composition of column B is altered by reducing the water to 13.864%, removing the sugar, and using Agave Premium Syrup (South Africa), very bland—70 Brix, at 2.160%.

The last two columns of FIGS. 1A and 1B are labeled "butter spread," and include ingredients very similar to column C except the high oleic sunflower oil is replaced with clarified butter/ghee (fresh pasteurized cream) at 79.5%.

Turning next to FIG. 2, for an all-natural mayonnaise that is heat stable, the compositions in columns MA and MB are provided. In columns MA and MB are found a heat stable Mayonnaise (egg) that has the following ingredients: 11.781% to 13.781% water that is distilled (no minerals), respectively, 1.0% *Quillaja*, 0.069% white vinegar (50 grain), 0.092% lemon juice, 0.825% salt, 1.468% sugar, 0.119% mustard flour, and 0.917% gluconic acid. A pre-blend of oil flavor and natural anti-oxidants is also provided that includes 0.037% natural egg flavor (F 14752), 79.5% high oleic sunflower oil, 0.092% MTD-10 (0.015% of oil), 0.1% RGT12 Plus Dry (0.2% of product). Column MA includes 4.0% whole eggs and 0.007% Ca EDTA (75 ppm).

Alternatively, 2.0% egg yolks can be substituted for the whole eggs as shown in column MB. The process includes blending the water, *Quillaja*, and dry ingredients in a mixer (such as a CUISINART®). mixer with blade operating at high speed). The oil is added very slowly to obtain the emulsion. This blend is run at high speed to make the emulsion smooth.

An eggless mayo can be provided by changing the water to 15.781% and eliminating the eggs and the 0.007% CaE-DTA, similar to the "Eggless A version" of FIG. 1A.

The mayonnaise composition above can be made to take a freeze-thaw without turning to liquid by adding a combination of these natural gums as shown in columns MAF and MBF in FIG. 2. In particular, gum arabic, guar and xanthan gum are added to achieve a freeze-thaw stable product that holds its texture. When added, it adds a slight amount of viscosity. Preferably this is added at 0.3% of the blend: 50% gum arabic, 30% guar gum and 20% xanthan gum. The range can be 0.01% to 1.0% and more preferably 0.2% to 0.4%. In column MAF the water is at 11.481% and whole eggs are used. In column MBF the water is 13.481% and egg yolks at 2.0% are used.

FIG. 3 illustrates an all-natural eggless mayo that is heat stable, which is an alternative to the compositions of FIGS. 1A-1B. In column C-2, the ingredients include water that is distilled, having no minerals, at 13.014%; Ticaloid 1155 (gum Arabic/guar/Xanthan Gum 0.2% to 0.4%) at 0.300%; *Quillaja* natural flavor at 1.0%; white vinegar (50 grain) at 2.569%; lemon juice, natural strength, and all natural 0.092%; salt at 0.625%; sea salt #68 at 0.625%; Agave Premium Syrup (South African), very bland at 2.160%; mustard flour at 0.119%; gluconic acid (50%) at 0.717%; RGT12 Plus Dry (0.2% of product) at 0.10%; dry vinegar at 0.050%; and a pre-blend of oil, gums, flavor and antioxidants that include natural egg flavor F14752 at 0.037%; high oleic sunflower oil at 78.5%; and MTD-10 (0.015% of oil) at 0.092%. This is processed by blending water, vinegar, lemon juice, *Quillaja*, dry ingredients in a CUISINART® mixer with blade operating at a high speed, then slowly adding the oil to generate a smooth, creamy emulsion.

Batch E is a lower salt version of column C-2 in which the water is 13.714%, the Ticaloid is at 0.200%, the salt is at 0.325%, and the sea salt is at 0.325%.

FIG. 4 is an improved eggless mayo that is all natural and heat stable. Here, the ingredients are water that is distilled, having no minerals, at 15.156%; Ticaloid 1155 (gum Arabic/guar/Xanthan Gum 0.2% to 0.4%) at 0.300%; *Quillaja* natural flavor at 1.0%; white vinegar (50 grain) at 0.069%; lemon juice, natural strength, and all natural 0.092%; salt at 0.625%; sea salt #68 at 0.625%; sugar at 1.468%; mustard flour at 0.119%; gluconic acid (50%) at 0.717%; dry vinegar at 0.100%; and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. This is processed by blending water, vinegar, lemon juice, *Quillaja*, dry ingredients in a CUISINART® mixer with blade operating at a high speed, then slowly adding the oil to generate a smooth, creamy emulsion.

Column C is similar to column B except the water is reduced to 14.464%, and Agave Premium Syrup at 2.160% is used instead of the sugar. The compositions in FIG. 4 achieve a heat stable, freeze-thaw stable all-natural product with a sodium reduction of 50%.

Turning next to FIG. 5, shown therein is a table for an all-natural, non-melting cheese (solid or semi-soft) that includes 97.0% to 99.9% cheese, such as cheddar, Swiss, American, and 0.1% to 3.0% *Quillaja*. The process involves shredding the cheese, adding the *Quillaja*, blending, and then heating to about 140 degrees F. while stirring occasionally until cheese has melted and blended completely, then chill to set.

FIG. 5 also shows a cheese sauce that includes 25% to 85% with a preferred amount at 64% of cheese, 0.1% to 3.0% and preferably 2.0% of *Quillaja*, 0% to 35% and preferably 12% cream (30% butter fat), 0% to 20% and preferably 12% unsalted butter, and 0% to 35%, and preferably 10.0% water. The cheese is shredded and *Quillaja* added with water and blended. The blend is heated to about 140 degrees F., while stirring constantly, and then add cream and butter. Chill to set. FIG. 5 shows the ingredients and process for an all-natural, non-melting chocolate that includes 0.1% to 3.0% and preferably 2.0% *Quillaja*, and 99.9% to 97% and preferably 98% collocate, such as sugar, cacao beans, cocoa butter, lecithin, vanilla with or without added milk. The process includes blending semi-sweet chocolate chips with *Quillaja*, heating to 105 degrees F., to 110 degrees F., while stirring constantly until thoroughly blended. Immediately chill to 40 degrees F., to 70 degrees F., to set the chocolate.

Turning next to FIG. 6, an all-natural, non-separating nut butter is provided that includes 1% by weight of *Quillaja*, and nut butter that includes 49.5% oil, 18.56% carbohydrates, 21.65% protein, and 9.29% water and minerals. The nut butter is heated to 120 degrees F., and the *Quillaja* is blended in, and then allowed to cool to ambient temperature. Alternatively, the *Quillaja* (based on oil) is added to nuts or seeds that are ready to grind, and then these are blended to evenly distribute, then ground and cooled.

FIG. 7 is table for a heat stable creamy, fat or oil containing sauce that includes 38.8% water, 1.2% *Quillaja*, and 60% oil such as high stability Algal oil, vegetable oils, nut and seed oils, and animal sourced fat and oils. The water and

*Quillaja* is blended, and then the oil is slowly added while blending in a high shear mixer to obtain an emulsion. This stabilized creamy blend is ready to add to a target base, such as a creamy soup, creamy sauce, creamy dessert, creamy pudding, and the like. The completed formula can be hot filled, retorted, refrigerated or frozen.

*Quillaja* can be used to make natural oil soluble flavors, oil soluble spices extracts (essentials oils and oleoresins), water soluble for easy dispersion and making these flavor additions all natural. These flavors are now being made water soluble using polysorbate 80. *Quillaja* use level is 0.1% to 50.0% because the FDA limits emulsifier use in these formulas to 50%. The levels for a natural oil flavor extract, natural spice extract (essential oils, oleoresins) are: 99.9% to 50.00%.

FIG. 8 is a table that demonstrates the improved organoleptic characteristics of a processed meat food using the present invention. Briefly, meat patties, in this case chicken, were made using the process and compositions of the present invention and compared to other methods. This process is applicable to any type of meat or meat product, from full size animals, to animal parts, to processed animal meat, strips, breasts, ribs, loins, thighs, wings, flank, etc., and can even find particular uses in strips and/or jerky. The emulsion was used at two different levels to see what the impact the amounts would have on texture and to make sure that the higher oil level was properly held. Surprisingly, there was a noticeable texture difference with different emulsion levels (higher emulsion, softer texture, and lower cost). As such, the amounts can be adjusted to produce progressively softer jerky and strips. The emulsion was very stable and both versions tasted great.

The present invention can also be used with meat jerky to make crispy meat chips with a base in, e.g., a fried chicken flavor, a pepperoni flavor, bacon flavor, spicy flavor, jerk flavor, pepper flavor, etc. For this, a fine emulsion is made with, e.g., the chicken flavor, and the emulsion added (just like a hot dog), then thin slice and dry (either air dry or microwave vacuum dry). By comparison, if a hot dog were prepared without the stabilized emulsion of the present invention, the final product would have a greasy surface and flinty textured chip. By contrast, using the stabilized emulsion of the present invention, a final product resembling a potato chip that is light in texture with the oil captured within the protein matrix is obtained.

Fish, like tuna and salmon, are sold primarily fresh, frozen or canned, and some dried. Fresh has a very short shelf-life (about 4 to 6 days). Frozen is expensive, the ice crystals cause the fish muscle to soften and get mushy and, with prolonged storage, freezer burn, and rancidity become a problem. Canned causes the texture to get dry, stiff and flaky with some scorched flavors. Dried fish has a rancid flavor and is tough.

The post-pasteurization process is a gentle, cost economical process that preserves the fish texture from producing a softer texture like achieved in lox to firmer like in freshly cooked fish, but not flaky and dry like in canned. The post-pasteurization process is less costly compared to all other processes since it does not require costly refrigeration or freezing, nor costly retorting used in canning or lengthy drying times which is also costly.

Fish oils are rich in triple bond fatty acids (Omega 3' and Omega 6's) which are quickly and easily oxidized to cause rancidity. Drying with flowing air and lengthy drying times cause these oils to become rancid. Freezing causes a protective layer of water to become ice which now exposes these oils to oxygen, and they quickly become rancid.

Fresh fish has a short shelf-life due to the growth of microbes from normal contamination during processing.

Canned fish are subject to high temperatures (250° F. for a minimum of 6 minutes) which cause the texture to become dry, stiff and flaky. This process is energy intensive and costly.

This new post-pasteurization (or second pasteurization) process can achieve full pasteurization using either a low temperature (140° F. to 145° F.) longer time (30 minutes) or short time (1 minute) at 160° F. to 165° F. The longer time and lower temperature process produces a softer texture in fish resembling the texture of lox. The shorter time, higher temperature process produces a texture more like freshly cooked (firm, but not dry, stiff, and flaky like canned). The post-pasteurization process is the least costly process with a short drying time (2 hours or less) and a very mild heat process (6 to 7 minutes at 170.6° F./77° C.) with a 11 mm thickness (~½ inch) in a plastic vacuum pack. Along with a water activity of 0.90, this renders the fish shelf-stable.

The heat and freeze-thaw emulsion allows seasonings, flavors, and antioxidants to be added to the fish muscle which adds flavor, improves the texture, and helps prevent rancidity. Using a needle-free injector (streamlineprecision.com or s2iusa.com), the emulsion can be pressure injected into the fish muscle without causing damage to the muscle tissue which is seen with needle injectors. The seasonings, flavors and antioxidants are placed deep into the muscle which then diffuse throughout the muscle. The emulsion level added also controls the texture from firm (low level) to soft (higher level). In non-oily fish, like tuna, the emulsion helps adjust the texture from sushi soft to firmer like freshly cooked, but not stiff, dry and flaky like canned.

FIG. 9 is a flow chart for the processing of fish (or seafood), using salmon as an example. Raw salmon fillets enter one of two pathways. In FIG. 9, on the left, the pathway includes a smokehouse step that is extended to achieve a water activity of 0.9 and that is a first pasteurization step. Then the fish is vacuum-packed, and the fish is exposed to a second pasteurization step of 5-15 minutes (e.g., 10 minutes) at about 180° F., in a water bath. This second pasteurization step can also be in a steam or other heated tunnel rather than a water bath so package drying would not be necessary. It is critical that the vacuum-packed seafood is given a second pasteurization treatment while in the package. Next, the fish is placed in a dry package or pouch, and placed in, e.g., a sales carton.

Alternatively, FIG. 9 shows on the right a flowchart in which the fish (or seafood) enters a cycle that can begin with an optional step of injecting brine into the fish. Next, the fish is de-skinned and placed in an optional hold at 106° F. for up to 2 hours at 95% relative humidity if fermenting. The fermenting step can be for a tangy flavoring, such as BBQ or Buffalo wing flavor. The brine can include a blend and/or emulsion that includes a *Pediococcus* starter culture for a fermented product (pH 5.6) for an acidic taste. After the optional hold at 106 F, the fish can also optionally be flatted for, e.g., 5-15 seconds to achieve a uniform thickness, e.g., 8 to 15 mm. Next, the fish is heated and dried in the smokehouse to a water activity of 0.9 to provide the first pasteurization. Next, the fish is sliced to size and vacuum-packed. The vacuum-packed fish is then pasteurized a second time at a temperature of 140° F. to 145° F. for 30 or more minutes, or for 1 to 5 minutes at 160° F. to 165° F. Next, the fish is placed in a dry package or pouch, and placed in, e.g., a sales carton.

The vacuum-packed fish (or seafood) in its moisture and oxygen impermeable film, which is subject to a second pasteurization in the water bath, is dried to remove water from packaging after the water bath pasteurization and is placed in, e.g., a sales carton.

As the meat gets thicker, the drying time gets longer, but not by much. At 1 inch to 1.5 inches (the thickness of a salmon fillet or 4-ounce whole chicken breast) the time is less than 3 hours. The present invention uses pasteurizing and drying to the 0.90 water activity target at the same time in a smokehouse or using the ProGrill® to pasteurize and then drying separately as shown FIG. 9, which is much faster and cheaper. This is a two-step pasteurization process: That is the fish or seafood is pasteurized a first time before vacuum packing, and then pasteurized again in the vacuum package.

Once vacuum packed in a moisture and oxygen-impermeable packaging film, the fish or seafood does not go rancid, nor change its water activity. The fish or seafood has a shelf-life beyond two years at room temperature. The same process can be used for beef strips and chicken strips, which maintain their taste after 4 years stored at room temperature.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A method of preserving a fish or seafood product comprising:
   contacting an emulsion with the fish or seafood product for a time sufficient to, wherein the emulsion comprises by weight: 10% to 50% water, 0.1 to 4.0% *Quillaja*, 0.1% to 8% meat flavoring, 60% to 80% high oleic sunflower oil, meat seasoning, 0-2.0% salt, and optionally adding one or more stabilizers;
   a first pasteurizing step;
   vacuum packing the fish or seafood in a moisture and oxygen-impermeable packaging film; and
   a second pasteurizing step after vacuum packing the fish or seafood in a moisture and oxygen-impermeable packaging film, wherein the fish or seafood product is heat stable and freeze-thaw stable.

2. The method of claim 1, further comprising a drying step selected from a drying time of 2 hours or less hours, wherein the fish or seafood is at about 11 mm (or 3/16 inch) thick and is dried to a water activity between 0.89 to 0.91.

3. The method of claim 1, further comprising a heating step of 5 to 10 minutes at 170.6° F./77° C.

4. The method of claim 1, further comprising injecting the emulsion into the muscle of the fish or seafood.

5. The method of claim 1, wherein the first, the second, or both pasteurizing step of the fish or seafood is at a temperature of 140° F. to 145° F. for 30 or more minutes, or for 1 to 5 minutes at 160° F. to 165° F.

6. The method of claim 1, wherein the fish or seafood is selected from tuna, salmon, sea-bass, herring, anchovy, sardine, pollock, catfish, flounder, lake trout, grouper, halibut, mahi mahi, orange roughy, red snapper, shark, swordfish, tilefish oil, cod, eel, hake, trout, tilapia, whiting, mackerel, shrimp, crab, shellfish, mussel, scallop, clam shell, prawn, or squid.

7. The method of claim 1, further comprising adding 0.01% to 0.3% RGT 12 Plus Dry, 0.01% to 1.0% by weight of a gum or gum blend including one or more natural gums selected from the group consisting of gum Arabic, guar and Xanthan gum.

8. The method of claim 7, wherein the gum blend comprises 50% gum Arabic, 30% guar gum and 20% Xanthan gum.

9. The method of claim 1, wherein the emulsion is defined further as comprising, by weight:

11.00 to 14.00% water, 1.0% *Quillaja,* 0.07% white vinegar, 0.09 to 0.10% lemon juice, 0.80-0.90% salt, 1.40 to 1.50% sugar, 0.10-0.12% mustard flour, 0.90 to 1.00% gluconic acid; and a pre-blend comprising: 0.03 to 0.04% natural egg flavor, 79.0 to 80.0% high oleic sunflower oil, 0.09-0.10% tocopherols (diluted to 0.015% in oil), 0.10% blend of rosemary and green tea extracts, 2% to 4% eggs; and 0.1% to 0.3% CaEDTA; or 11.781% to 13.781% water, 1.0% *Quillaja,* 0.069% white vinegar, 0.092% lemon juice, 0.825% salt, 1.468% sugar, 0.119% mustard flour, 0.917% gluconic acid; and a pre-blend comprising: 0.037% natural egg flavor, 79.5% high oleic sunflower oil, 0.092% MTD-10, 0.1% RGT12 Plus Dry, 2% to 4% eggs; and 0.1% to 0.3% CaEDTA; or eggs comprise one of 4% whole eggs or 2.0% egg yolks and further comprising, by weight, 0.01% to 1.0% of a gum or gum blend including one or more natural gums selected from the group consisting of gum Arabic, guar and Xanthan gum.

10. The method of claim 1, wherein the preservatives are selected from at least one of: phosphates, k-carrageenan, green tea extract, rosemary extract, mixed tocopherols, celery powder, or beet powder, to 180 ppm nitrites.

11. The method of claim 1, wherein the fish or seafood product is contacted with the emulsion for at least 1 to 90 minutes at room temperature.

12. The method of claim 1, wherein the emulsion is a concentrate or a ready-to-use emulsion.

13. A fish or seafood product having improved organoleptic characteristics made by a method comprising:

contacting an emulsion with the fish or seafood product for a time sufficient to, wherein the emulsion comprises by weight: 10% to 50% water, 0.1 to 4.0% *Quillaja,* 0.1% to 8% meat flavoring, 60% to 80% high oleic sunflower oil, meat seasoning, 0-2.0% salt and optionally adding one or more stabilizers;

a first pasteurizing step of the fish or seafood at a temperature of 140° F. to 145° F. for 30 or more minutes, or for 1 to 5 minutes at 160° F. to 165° F.;

vacuum packing the fish or seafood in a moisture and oxygen-impermeable packaging film; a second pasteurizing step at a temperature of 140° F. to 145° F. for 30 or more minutes, or for 1 to 5 minutes at 160° F. to 165° F., after vacuum packing the fish or seafood in a moisture and oxygen-impermeable packaging film, wherein the fish or seafood product is heat stable and freeze-thaw stable.

14. The fish or seafood product of claim 13, further comprising a drying step selected from a drying time of 2 hours or less hours, wherein the fish or seafood is at about 11 mm (or ³⁄₁₆ inch) thick and is dried to a water activity between 0.89 to 0.91.

15. The fish or seafood product of claim 13, further comprising a heating step of 5 to 10 minutes at 170.6° F./77° C. in a vacuum pack or bag.

16. The fish or seafood product of claim 13, further comprising injecting the emulsion into the muscle of the fish or seafood.

17. The fish or seafood product of claim 13, wherein the fish or seafood is selected from tuna, salmon, sea-bass, herring, anchovy, sardine, pollock, catfish, flounder, lake trout, grouper, halibut, mahi mahi, orange roughy, red snapper, shark, swordfish, tilefish oil, cod, eel, hake, trout, tilapia, whiting, mackerel, shrimp, crab, shellfish, mussel, scallop, clam shell, prawn, or squid.

18. The fish or seafood product of claim 13, further comprising 0.01% to 0.3% RGT 12 Plus Dry, 0.01% to 1.0% by weight of a gum or gum blend including one or more natural gums selected from the group consisting of gum Arabic, guar and Xanthan gum.

19. The fish or seafood product of claim 18, wherein the gum blend comprises 50% gum Arabic, 30% guar gum and 20% Xanthan gum.

20. The fish or seafood product of claim 13, wherein the emulsion is defined further as comprising:

by weight, 11.00- to 14.00% water, 1.0% *Quillaja,* 0.07% white vinegar, 0.09 to 0.10% lemon juice, 0.80-0.90% salt, 1.40 to 1.50% sugar, 0.10-0.12% mustard flour, 0.90 to 1.00% gluconic acid; and a pre-blend comprising: 0.03 to 0.04% natural egg flavor, 79.0 to 80.0% high oleic sunflower oil, 0.09 to 0.10% tocopherols (diluted to 0.015% in oil), 0.10% blend of rosemary and green tea extracts, and 2% to 4% eggs; and 0.1% to 0.3% Ca EDTA; or by weight, 11.781% to 13.781% water, 1.0% *Quillaja,* 0.069% white vinegar, 0.092% lemon juice, 0.825% salt, 1.468% sugar, 0.119% mustard flour, 0.917% gluconic acid; and a pre-blend comprising: 0.037% natural egg flavor, 79.5% high oleic sunflower oil, 0.092% MTD-10, 0.1% RGT12 Plus Dry, 2% to 4% eggs; and 0.1% to 0.3% Ca EDTA; or eggs comprise one of 4% whole eggs or 2.0% egg yolks and further comprising, by weight, 0.01% to 1.0% of a gum or gum blend including one or more natural gums selected from the group consisting of gum Arabic, guar and Xanthan gum.

21. The fish or seafood product of claim 13, wherein the preservatives are selected from at least one of: phosphates, k-carrageenan, green tea extract, rosemary extract, mixed tocopherols, celery powder, or beet powder, to 180 ppm nitrites.

22. The fish or seafood product of claim 13, wherein the meat is contacted with the emulsion for at least 1 to 90 minutes at room temperature.

23. The fish or seafood product of claim 13, wherein the emulsion is a concentrate or a ready-to-use emulsion.

* * * * *